(12) United States Patent
Hsiung et al.

(10) Patent No.: US 9,591,025 B2
(45) Date of Patent: Mar. 7, 2017

(54) IP-FREE END-POINT MANAGEMENT APPLIANCE

(71) Applicant: International Business Machines Corporation, Armonk, NY (US)

(72) Inventors: Wei-Hsiang Hsiung, Taipei (TW); Sheng-Tung Hsu, Taipei (TW); Cheng-Ta Lee, Taipei (TW); Ming-Hsun Wu, New Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/300,294

(22) Filed: Jun. 10, 2014

(65) Prior Publication Data
US 2015/0007254 A1    Jan. 1, 2015

(30) Foreign Application Priority Data
Jun. 28, 2013   (TW) .............. 102123408 A

(51) Int. Cl.
*H04L 29/06* (2006.01)
(52) U.S. Cl.
CPC .......... *H04L 63/20* (2013.01); *H04L 63/0209* (2013.01); *H04L 63/0236* (2013.01)
(58) Field of Classification Search
None
See application file for complete search history.

(56) References Cited

U.S. PATENT DOCUMENTS

| | | |
|---|---|---|
| 7,331,061 B1 | 2/2008 | Ramsey et al. |
| 7,509,673 B2 | 3/2009 | Swander et al. |
| 7,546,452 B2 | 6/2009 | Aissi et al. |
| 7,917,627 B1 | 3/2011 | Andriantsiferana et al. |
| 8,136,149 B2 | 3/2012 | Freund |
| 8,572,717 B2* | 10/2013 | Narayanaswamy ............ 726/12 |
| 8,849,988 B2* | 9/2014 | Mutnuru et al. ............... 709/224 |
| 2003/0131253 A1* | 7/2003 | Martin et al. ....... G06F 11/1471 726/6 |
| 2008/0229381 A1* | 9/2008 | Sikka et al. ...................... 726/1 |
| 2012/0233656 A1 | 9/2012 | Rieschick et al. |
| 2014/0181844 A1* | 6/2014 | Von Bokern .......... G06F 21/305 719/321 |

OTHER PUBLICATIONS

Actiontec USB Bluetooth Device BTM200, retrieved from the internet on Jun. 5, 2014: http://download.cnet.com/Actiontec-USB-Bluetooth-Device-BTM200/3000-2112_4-202684.html, 5 pages.
(Continued)

*Primary Examiner* — Brandon Hoffman
(74) *Attorney, Agent, or Firm* — Cantor Colburn LLP

(57) ABSTRACT

An aspect includes a method of receiving a management command in an appliance to configure a network security policy, where the appliance is connected to a network end-point device. The method includes receiving a packet from a security device. Checking is performed to determine whether the packet includes a specific identifier. Upon a determination that the packet received includes a specific identifier, the management command is retrieved from a payload of the packet to configure the appliance.

18 Claims, 6 Drawing Sheets

(56) References Cited

OTHER PUBLICATIONS

Morning Glory Technologies Active IP Sensor, retrieved from the internet www.morningglorytech.com/ActiveIPSensor.html on Apr. 23, 2014, 9 pages.

BIG-IP port sensor, retrieved from the internet http://publib.boulder.ibm.com/infocenter/tivihelp/v10r1/index.jsp?topic=%2Fcom.ibm.taddm.doc_7.2%2FSensorGuideRef%2Fr_cmdb_sensor_bigip-port.html, Apr. 23, 2014, 2 pages.

Total Security, "Comprehensive Endpoint Security," Jul. 2009 Check Point Software Technologies Ltd., 10 pages.

Switch Port Mapping Tool, "Managed Switch Port Mapping Tool," retrieved from the internet www.netscantools.com/spmapmain.html on Apr. 23, 2014, 2 pages.

M. Naveed, et al., "Network Instrusion Prevention by Configuring ACLs on the Routers, based on Snort IDS alerts," 2010 6th International Conferenence on Emerging Technologies (ICET), Oct. 18-19, 2010, 6 pages.

Packet Trap RMM, "Migrating to a Managed Service Model through Automation" Dec. 2012, 4 pages.

Managed Switch Port Mapping Tool from NetScan Tools, retrieved from the internet www.switchportmapper.com on Apr. 23, 2014, 2 pages.

\* cited by examiner

IP-FREE END-POINT MANAGEMENT APPLIANCE

PRIORITY

The present application claims priority to Taiwan Patent Application No. 102123408, filed on Jun. 28, 2013, and all the benefits accruing therefrom under 35 U.S.C. §119, the contents of which are incorporated by reference in its entirety herein.

BACKGROUND

The present disclosure relates to appliances capable of providing network security protection, and more particularly, to an appliance which comprises an "IP-free management module" for receiving a management command to configure a network security policy, so as to provide network security protection to a network end-point device as the appliance is connected to the protected network end-point device.

FIG. 1 is a schematic view of a conventional intranet. A user of an external end-point 101 accesses a network connection device 106 of enterprises in a demilitarized zone (DMZ) 105 through an extranet 103. The network connection device 106 is a device exemplified by a switch, a bridge, or a router and adapted to controlling the direction of a flow of network packets. A conventional network security device, such as a firewall, an intrusion detection system (IDS), or an intrusion prevention system (IPS), is disposed in the DMZ 105 and coupled to the network connection device 106.

An intranet resource 107 includes but is not limited to specific appliances or servers. The intranet resource 107 comprises an unlimited number of appliances or servers, or a combination thereof. For example, the intranet resource 107 is a local area network (LAN). An appliance, commonly known as an Internet appliance, is built-in with networking capability and has a specific function. Unlike a general-purpose computer, the appliance is usually designed in accordance with a specific purpose or a specific service to conduct a specific transaction, and thus the appliance features high performance.

The intranet resource 107 is exemplified by a virtual local area network (VLAN). Network engineers in charge of internal resources of enterprises or organizations can perform logical grouping of apparatuses in different physical LANs by VLAN technology, so as to provide full information security protection.

Moreover, to ensure internal data security, enterprises or organizations rely upon a virtual private network (VPN) and thus install a VPN server in the DMZ 105 to enable the user to access internal resources from outside through a network connection. The VPN server is coupled to the network connection device 106. The user of the external end-point 101 logs in to the VPN server. After being authenticated and authorized, the user of the external end-point 101 gets connected to the network connection device 106 through the VPN. In some embodiments, the VPN server is not necessary; in other words, the user of the external end-point 101 may connect the network connection device 106 and the intranet resource 107 without a VPN. Other hardware and software components (not shown), such as an additional computer system, a router, and a firewall, are disposed in the extranet 103 between the VPN server (or the network connection device 106) and the external end-point 101.

Furthermore, to ensure internal data security, enterprises or organizations are connected to end-points in their intranet to configure network security policies, by providing security devices, including a firewall, antivirus software, an intrusion detection system (IDS), and an intrusion prevention system (IPS), so as to ensure Web-based communication security. The end-points in the intranet are each a host computer (such as a router, a workstation, or a server) or a data circuit-terminating equipment (DCE) (such as a bridge or a switch device, etc.).

To provide a network security policy to an end-point, it is necessary that a software agent located at the end-point, i.e., an end-point management agent is installed. However, a software agent may have a number of challenges such as:

1. A software agent is usually operating system-dependent (OS dependent) and thus difficult to install by a user. Furthermore, a software agent seldom supports various operating systems (OSs), for example, Solaris or a custom-built embedded Linux core (such as a Linux TV box).

2. A software agent may be susceptible to malware infection.

3. A software agent can be stopped manually by a user.

4. A software agent can take up too much system resources, such as CPU and memory.

A hardware security protection device is the alternative to a software agent in providing a network security policy to an end-point. Examples of a hardware security protection device include a router, an intrusion prevention system (IPS), and a residential gateway. However, a hardware security protection device is usually a router-level device and thus requires an additional IP address for managing the hardware security protection device.

SUMMARY

According to an aspect, a method of receiving a management command in an appliance is provided to configure a network security policy, where the appliance is connected to a network end-point device. The method includes receiving a packet from a security device. Checking is performed to determine whether the packet includes a specific identifier. Upon a determination that the packet received includes a specific identifier, the management command is retrieved from a payload of the packet to configure the appliance.

According to another aspect, a computer program product is provided for receiving a management command in an appliance to configure a network security policy, where the appliance is connected to a network end-point device. The computer program product includes a computer readable storage medium having program instructions embodied therewith, the program instructions readable by a processor to cause the processor to perform a method. The method includes receiving a packet from a security device. Checking is performed to determine whether the packet includes a specific identifier. Upon a determination that the packet received includes a specific identifier, the management command is retrieved from a payload of the packet to configure the appliance.

According to a further aspect, an appliance includes a bus, a memory connected to the bus, and a processing unit connected to the bus. The memory includes instructions. The processing unit is operable to execute the instructions to implement a method of receiving a management command in the appliance to configure a network security policy, where the appliance is operable to connect to a network end-point device. The method includes receiving a packet from a security device. Checking is performed to determine whether the packet includes a specific identifier. Upon a determination that the packet received includes a specific identifier, the management command is retrieved from a payload of the packet to configure the appliance.

BRIEF DESCRIPTION OF THE SEVERAL VIEWS OF THE DRAWINGS

In order that the advantages of the invention will be readily understood, a more particular description briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Figure 1:
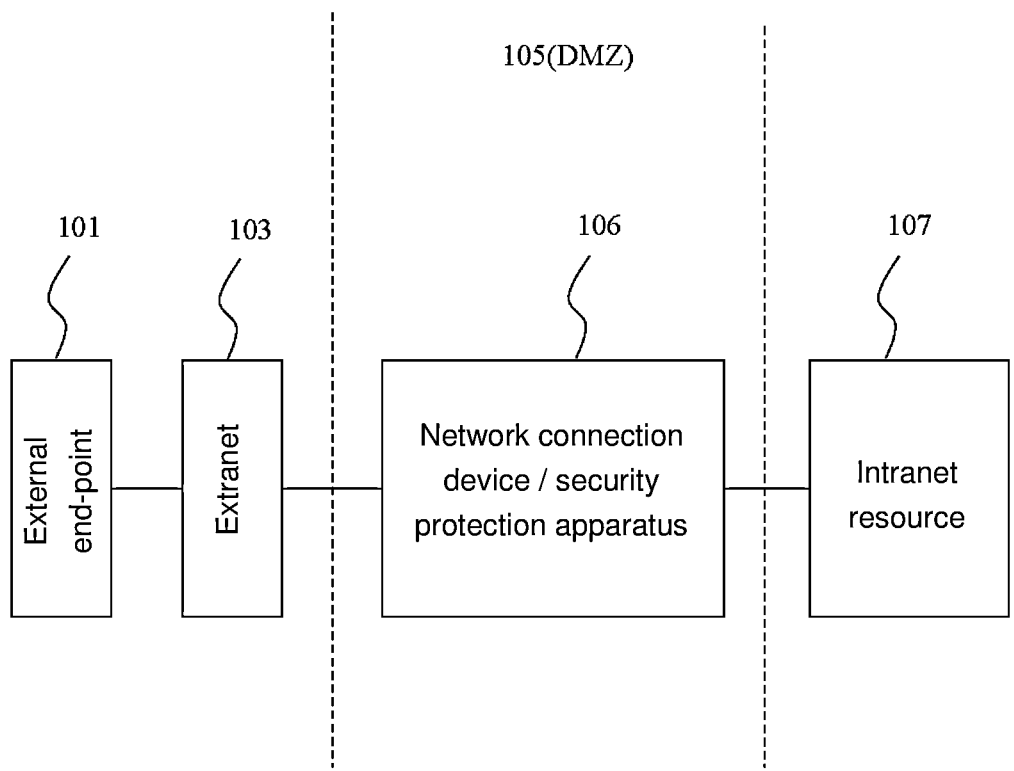
FIG. 1 is a schematic view of a conventional intranet.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

As will be appreciated by one skilled in the art, the present invention may be embodied as a computer system/device, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

An embodiment provides a small appliance directly coupled to an end-point. The small appliance is hereinafter referred to as a mini-box. The mini-box may have features as follows:

1. IP-free management: although the mini-box is directly coupled to network ports (such as Ethernet ports) of end-points and thus does not need to be allocated an additional IP address, it is still practicable to provide a network security policy to the mini-box or update software/firmware thereof so as to effectuate network security protection.

2. IPS offloading: it substitutes for an IPS to block malicious traffic at the end-points in the intranet, so the malicious traffic will be blocked at its starting end, thereby preventing infection from spreading; furthermore, it functions as an IPS in the intranet.

3. It can serve as a firewall in an intranet.

4. It does not take up system resources, such as CPU and memory.

5. Its network security policy cannot be stopped manually by a user.

6. It is OS-independent.

As the mini-box of an embodiment is an OS-independent apparatus as opposed to a software agent in effectuating a security protection policy, the user need not install any software agent on its operating system (OS), and thus extension of the functions of the mini-box can be easily achieved through software component upgrade.

According to an embodiment, provided herein is a method of receiving a management command in an appliance to configure a network security policy, so as to provide network security protection to a protected network end-point device as the appliance is connected to the protected network end-point device. The method includes the steps of: receiving a packet from a security device; checking and determining whether the packet comprises a specific identifier; and retrieving, in response to existence of the specific identifier in the packet received, the management command from a payload of the packet to configure the appliance.

According to another embodiment, a computer program product comprises a computer-readable medium having therein a stored program code executable on an appliance to implement the aforesaid method for receiving a management command in the appliance to configure a network security policy and providing network security protection to a protected network end-point device as the appliance is connected to the protected network end-point device.

According to yet another embodiment, an appliance comprises: a bus; a memory connected to the bus, wherein the memory comprises a set of commands; and a processing unit connected to the bus, wherein the processing unit executes the command to implement the aforesaid method for receiving a management command in the appliance to configure a network security policy and providing network security protection to a protected network end-point device as the appliance is connected to the protected network end-point device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

Referring now to FIG. 2A through FIG. 4C, computer systems/devices, appliances, methods, and computer program products are illustrated as structural or functional block diagrams or process flowcharts according to various embodiments of the present invention. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in a block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

<Hardware Environment>

Figure 2A:
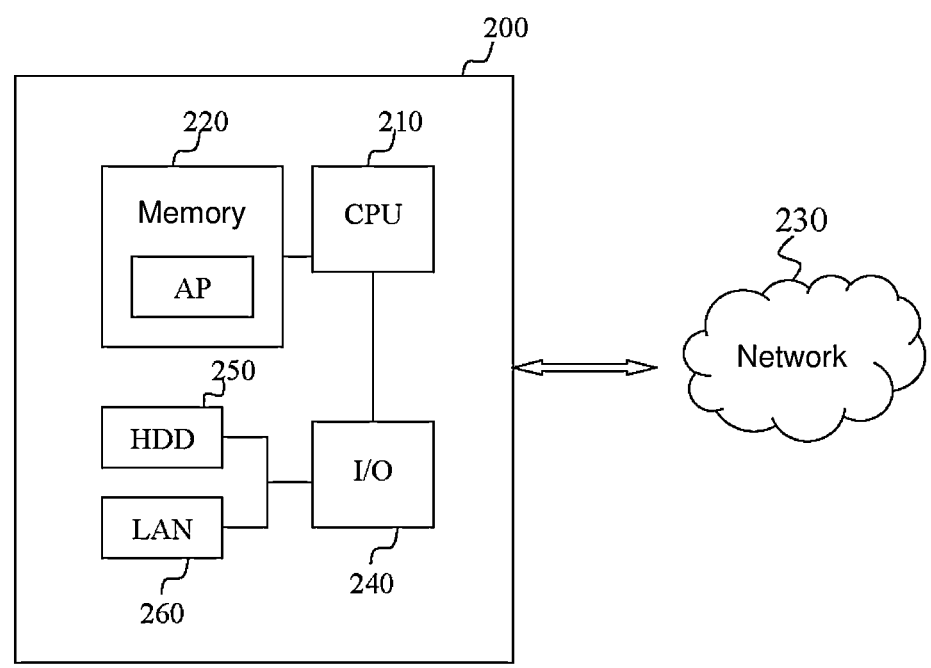
FIG. 2A is a block diagram of a mini-box hardware framework according to an embodiment of the present invention.

Referring to FIG. 2A, there is shown a block diagram of a mini-box hardware framework according to an embodiment of the present invention. In an embodiment, the mini-box is exemplified by Raspberry Pi which is a specific small appliance built-in with networking capability and capable of performing a specific function. Raspberry Pi comes in the form of a system-based single-board computer as large as a credit card.

Referring to FIG. 2A, a mini-box 200 has a processor 210, a memory 220, and an input/output (I/O) unit 240. In this regard, an input/output (I/O) bus is exemplified by a high-speed serial bus, such as PCI-e bus or any appropriate bus structure. A connection to the input/output (I/O) bus can be effectuated by direct component interconnection or an add-on board. The input/output (I/O) unit 240 is coupled to a hard disk drive, a memory card (such as SD, SDHC, MMC) 250, and a LAN adapter 260. With the LAN adapter 260, the appliance 200 communicates with any end-point apparatus through a network 230. The network 230 is exemplified by a connection of any type, including a LAN with a fixed connection or a wide area network (WAN), or has dial-up Internet access through an Internet Service Provider (ISP), whether in a wired or wireless manner, for example, to communicate with the end-point apparatus computer through GSM or Wi-Fi-enabled wireless network. Other hardware and software components (not shown), such as an additional computer system, a router, and a firewall, can also be included in the network. Examples of the memory 220 include random access memory (RAM), read-only memory (ROM), and erasable programmable read-only memory (EPROM or flash memory). The memory 220 stores an operating system (OS), program code of a dedicated application AP, and various related data. The operating system (OS) is executed on the processor 210 to coordinate and exercise control over various components in the appliance 200. The processor 210 accesses the memory 220 to execute an application AP.

The application AP comprises at least an "IP-free management module". The management module comprises a program module and a command for receiving a management command to configure a network security policy and providing network security protection to a network end-point device as the mini-box is connected to the protected network end-point device. Therefore, portions of the functions of a network security device, for example, software modules of network security policies of a firewall, antivirus software, an intrusion detection system (IDS), and an intrusion prevention system (IPS), are installed in the mini-box as needed, and thus extension of the functions of the mini-box can be easily achieved through software component upgrade.

As the mini-box of an embodiment is an OS-independent apparatus as opposed to a software agent in effectuating a security protection policy, users need not install any software agent on the operating system (OS) of the protected end-point device.

The processing modules or software modules are provided in the form of modules in an application or implemented by means of a daemon. However, in other embodiments, the processing modules or software modules are implemented by means of any other appropriate programs. The "IP-free management module" comprises the code required for implementing the procedure depicted in FIG. 3 and described below.

Persons skilled in the art understand that the hardware of the mini-box 200 illustrated in FIG. 2A is subject to various changes which vary from embodiment to embodiment. Other internal hardware or peripheral devices, such as flash read-only memory (flash ROM), equivalent nonvolatile memory, or CD-ROM, can also supplement or replace the hardware illustrated in FIG. 2A.

The mini-box is directly coupled to network ports of the end-points, respectively, and thus does not need to be allocated an additional IP address, and in consequence the mini-box is deemed a transparent device for inspecting the traffic being conveyed by the mini-box. Therefore, packets pass through the mini-box without being noted by the user.

Figures 2B, 2C:
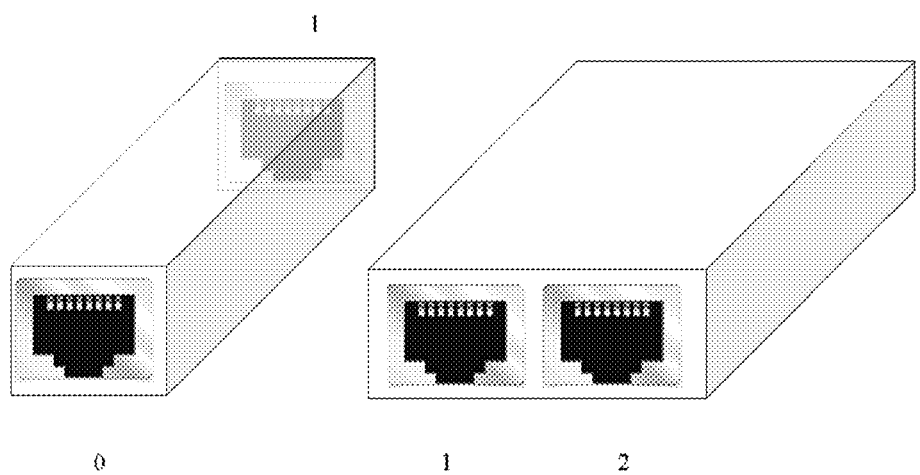
FIG. 2B is a schematic view of the mini-box comprising network ports arranged in a manner that female jacks (port 0, port 1) are formed at front and rear ends of the mini-box, respectively, and that a connector (such as RJ45) can be plugged in each of the female jacks.
FIG. 2C is a schematic view of the mini-box comprising network ports and thus capable of being mounted on a wall in a manner that the front end of the mini-box is exposed such that a connector (such as RJ45) can be plugged in the female jack (port 0, port 1) at the front end of the mini-box.

According to an embodiment, the mini-box is implemented as a standalone VoIP box or a portion of network ports (such as Ethernet ports) on a wall. Referring to FIG. 2B, the mini-box is implemented as a standalone box comprising network ports arranged in a manner that female jacks (port 0, port 1) are formed at front and rear ends of the standalone box, and that a connector (such as RJ45) can be plugged in each of the female jacks. Referring to FIG. 2C, the mini-box comprises network ports and thus is capable of being mounted on a wall in a manner that the front end of the mini-box is exposed such that a connector (such as RJ45) can be plugged in the female jack (port 0, port 1) at the front end of the mini-box.

<IP-free Management Module>

Figure 3:
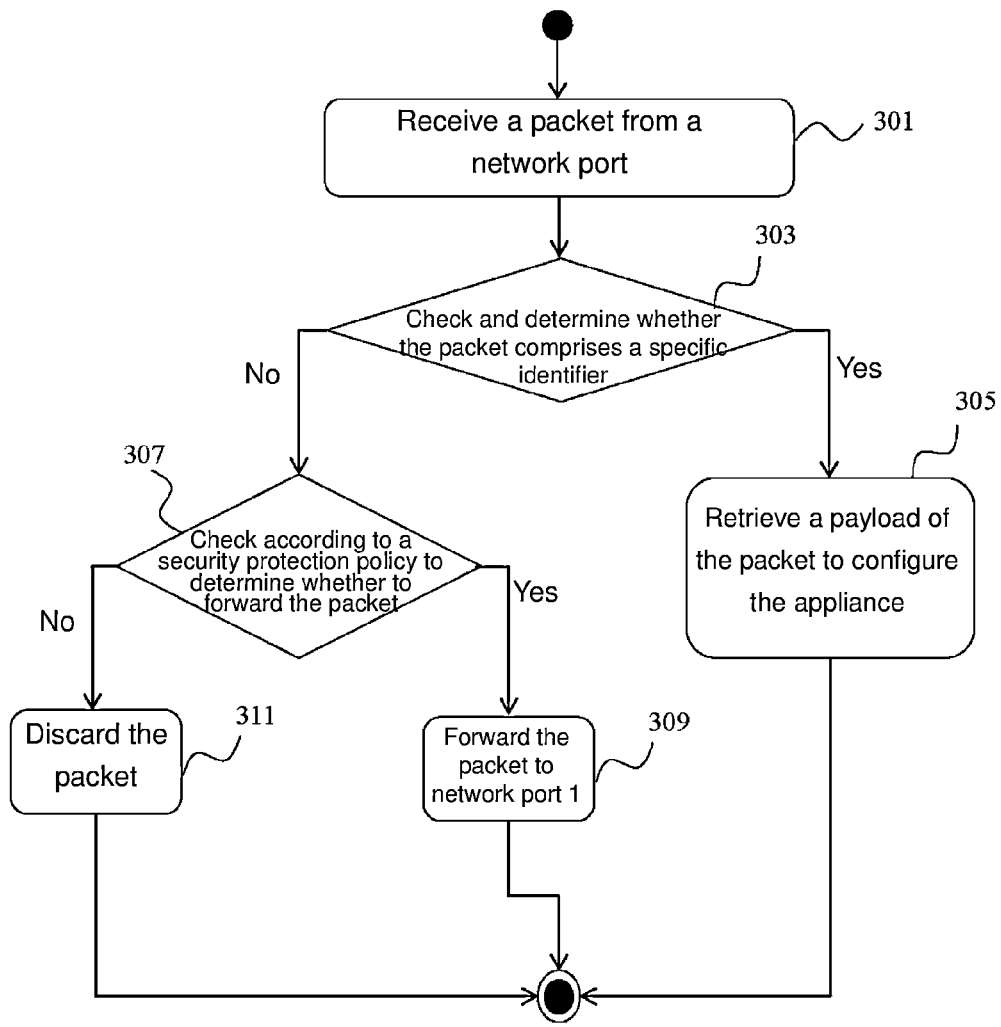
FIG. 3 is a flow chart of a method for an "IP-free management module" in the mini-box according to an embodiment of the present invention.

Referring to FIG. 3, there is shown a flow chart of a method for an "IP-free management module" in the mini-box according to an embodiment. The management module comprises a program module and a command for receiving a management command to configure a network security policy and providing network security protection to a network end-point device as the mini-box is connected to the protected network end-point device, wherein, after inspecting a packet received, the module introspects and determines whether the packet comprises the management command to configure the network security policy.

At step 301, a packet is received from a security device (such as a firewall and/or an IPS). The security device is connected to the first network port of the mini-box, such as port 0 of Ethernet port.

At step 303, checking and determining whether the packet comprises a specific identifier is performed to determine whether the packet comprises a management command. For example, step 303 entails inspecting and determining whether the Internet protocol (IP) header of the packet comprises a new ToS (type of service), whether a payload of the packet comprises a special code (also known as magic number), a specific packet length, and a specific media access control (MAC) address, and whether it is from a specific port. Therefore, given the IP address of a protected specific end-point device, it is practicable for the module to introspect and determine whether the received packet comprises the management command to configure the network security policy, provide a new network security policy, and update/extend its functions through software component upgrade. The protected specific end-point device does not receive the packets which comprise the management command.

At step 305, upon the determination that the received packet comprises a specific identifier, retrieving of the management command is performed from a payload of the packet to configure the appliance.

At step 307, upon the determination that the received packet does not comprise any specific identifier, checking is performed according to an existing security protection policy, to determine whether to forward the packet.

At step 309, the packet is forwarded to the protected network end-point device when the packet is determined in step 307 to be safe. The protected network end-point device is connected to the second network port of the mini-box, such as port 1 of Ethernet port.

At step 311, the packet is discarded when the packet is determined in step 307 to be unsafe.

<IPS Off-loading>

According to an embodiment, the mini-box operates in conjunction with a security device (such as a firewall and/or an IPS) of a demilitarized zone (DMZ) to thereby function as a security protection agent for effectuating network security protection and share the load of a security device.

<First Variant Embodiment>

Figure 4A:
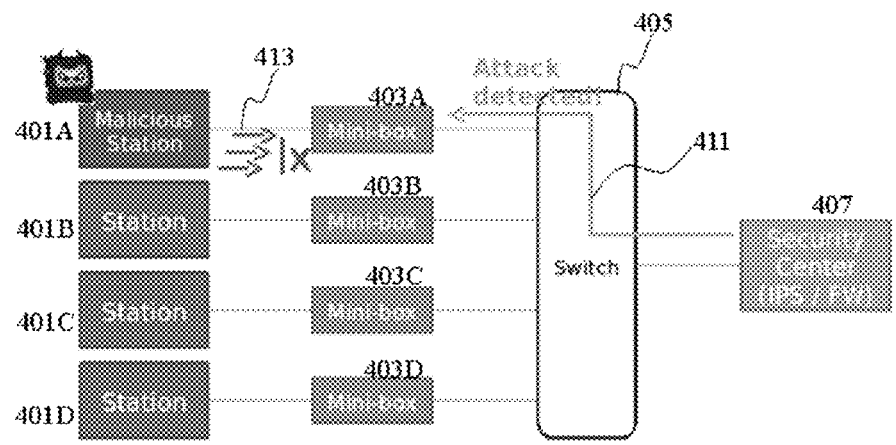
FIG. 4A is a schematic view of the first IPS off-loading of the mini-boxes according to a variant embodiment of the present invention.

Referring to FIG. 4A, there is shown a schematic view of the first IPS off-loading of the mini-boxes according to a first variant embodiment. As shown in FIG. 4A, four end-points 401A, 401B, 401C, 401D in an intranet are coupled to four mini-boxes 403A, 403B, 403C, 403D, respectively. The end-points 401A, 401B, 401C, 401D in the intranet are each allocated a unique IP address. The mini-boxes 403A-403D are coupled to a switch device 405 and then connected to an extranet resource through a security device 407 (such as a firewall and/or an IPS). Although FIG. 4A shows four end-points, the present invention is not restrictive of the quantity of the end-points. The mini-boxes do not need to be allocated an additional IP address each, because the mini-boxes are directly coupled to network ports (such as Ethernet ports) of the end-points, respectively; hence, it is still practicable to provide a network security policy to the mini-boxes or update software/firmware thereof through the management command so as to effectuate network security protection.

In the event that the end-point 401A is stricken with malware infection and the security device 407 detects that a packet from the end-point 401A is stricken with malware infection, the security device 407 will send a notice of attack detected to the mini-box 403A (arrow 411) to instruct the mini-box 403A to block the packet from the end-point 401A (arrow 413). Hence, the mini-box 403A substitutes for an IPS in blocking the malicious packet at the end-points in the intranet or, in other words, the malicious packet is blocked at the starting end of its source. Accordingly, the mini-boxes of embodiments share and therefore lessen the load of a security device.

If the mini-boxes are configured with the functions of a security device, such as a firewall and/or an IPS, the malicious packet will be directly blocked at its source so as to lessen the burden of the security device 407. The aforesaid configuration is accomplished by the management command. Therefore, how many functions of the security devices are off-loaded with the mini-boxes is subject to change as needed.

<Second Variant Embodiment>

Figure 4B:
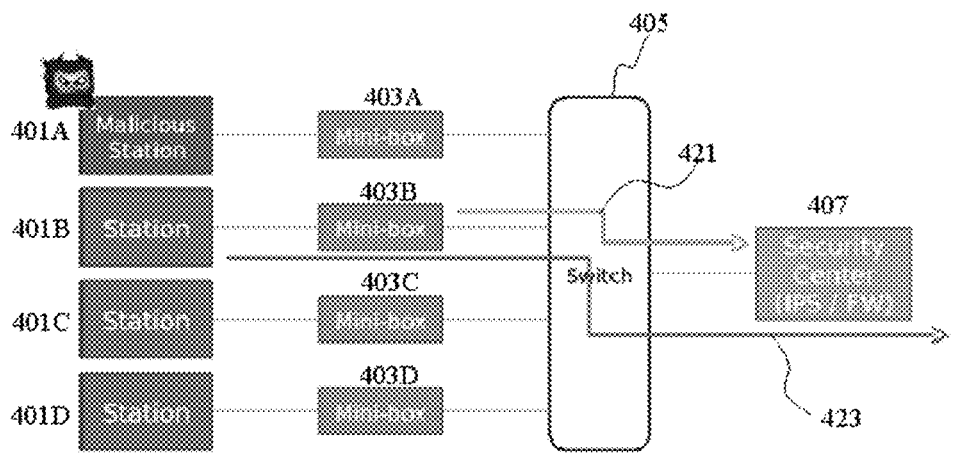
FIG. 4B is a schematic view of the second IPS off-loading of the mini-boxes according to a variant embodiment of the present invention.

Referring to FIG. 4B, there is shown a schematic view of the second IPS off-loading of the mini-boxes according to a second variant embodiment. In a situation where the mini-boxes are configured with the capability of calculating the number of packets sent but it remains unclear as to whether the end-point 401B is stricken with a malware infection, upon its detection that a predetermined number of packets (for example, 10K bytes) from the end-point 401B has not been stricken with a malware infection, the security device 407 determines that the packets sent from the end-point 401B are safe (arrow 421) and then gives low priority to the transmission of the packets from the end-point 401B. If a plethora of packets are sent to the security device 407, subsequent packets from the end-point 401B will bypass the security device 407 without being detected (arrow 423), thereby lessening the load of the security device 407.

<Third Variant Embodiment>

Figure 4C:
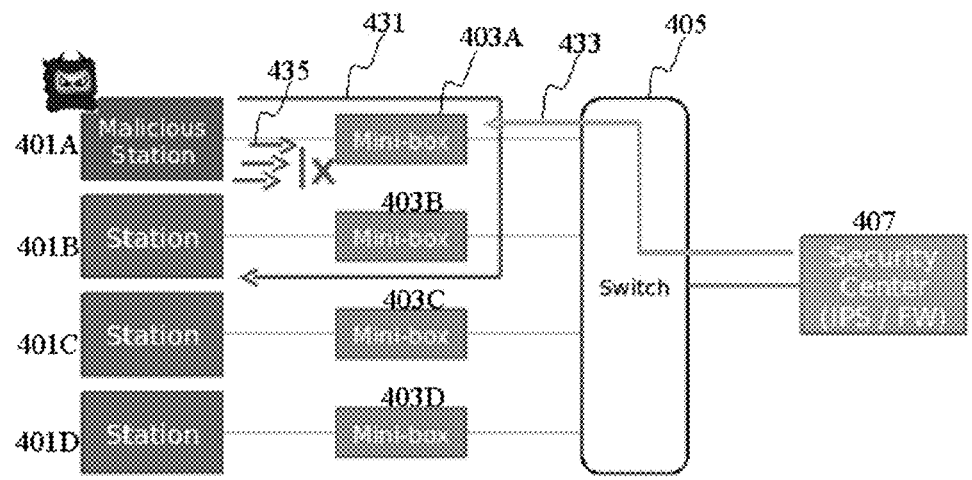
FIG. 4C is a schematic view of the third IPS off-loading of the mini-boxes according to a variant embodiment of the present invention.

Referring to FIG. 4C, there is shown a schematic view of a third IPS off-loading of the mini-boxes according to a third variant embodiment. In the event that the end-point 401A is stricken with a malware infection and the security device 407 detects by a conventional mirror port mechanism that a backup adapted from the packets from the end-point 401A and stored at a related port of the mini-box 403A in the switch device 405 is stricken with a malware infection as soon as the end-point 401A sends the packets to the end-point 401B (arrow 431), the security device 407 will send a notice of attack detected to the mini-box 403A (arrow 433) to instruct the mini-box 403A to block the packets from the end-point 401A (arrow 435). At this point in time, the mini-boxes function as an IPS in an intranet, thereby lessening the load of the security device 407.

<Firewall in Intranet>

Figure 4D:
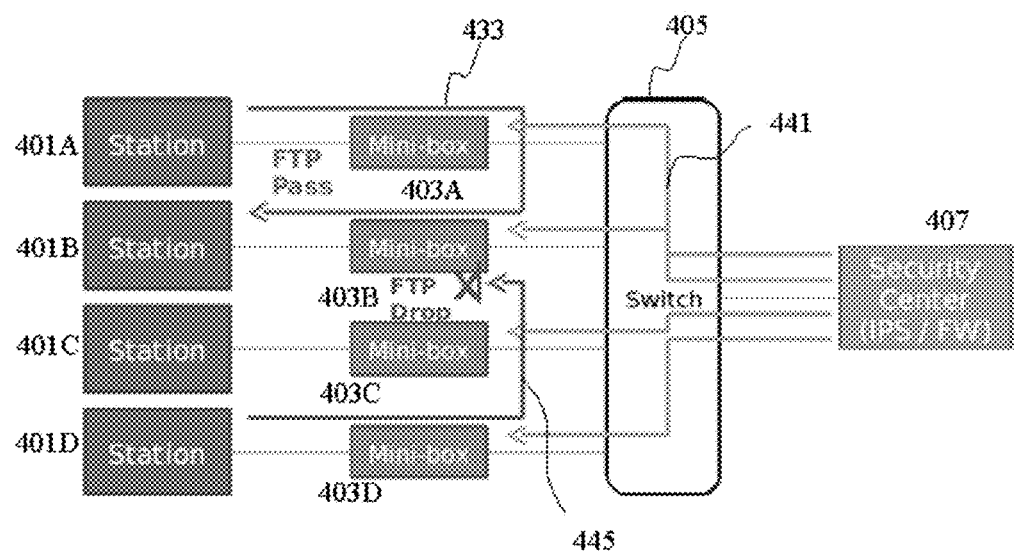
FIG. 4D is a schematic view of the mini-boxes functioning as a firewall in an intranet according to a variant embodiment of the present invention.

Referring to FIG. 4D, there is shown a schematic view of the mini-boxes functioning as a firewall in an intranet according to a variant embodiment. As shown in the diagram, the mini-boxes 403A, 403B, 403C, 403D are each configured with a network security policy by the management command (arrow 441). In this variant embodiment, assuming that the policy is security-oriented and thus configured to permit FTP transmission from the end-point 401A to the end-point 401B (arrow 443) but not FTP transmission from the end-point 401D to the end-point 401B (arrow 443). Therefore, the mini-boxes can function as a firewall for the end-points in an intranet to screen the traffic in the intranet.

As the mini-boxes are each an OS-independent apparatus as opposed to a software agent in effectuating a security protection policy, the user need not install any software agent on its operating system (OS), and thus extension of the functions of the mini-boxes can be easily achieved through software component upgrade.

Furthermore, the mini-boxes are not only for use with end-points in an intranet but are also for use any end-point apparatus over the Internet to receive value-added security protection services from service providers.

The foregoing preferred embodiments are provided to illustrate and disclose the technical features of the present invention, and are not intended to be restrictive of the scope of the present invention. Hence, all equivalent variations or modifications made to the foregoing embodiments without departing from the spirit embodied in the disclosure of the present invention should fall within the scope of the present invention as set forth in the appended claims.

What is claimed is:

1. A method of receiving a management command in a network appliance to configure a network security policy, the network appliance connected to a network end-point device, the method comprising:

receiving, by the network appliance, a packet comprising an Internet protocol (IP) header from a security device, the IP header comprising a destination IP address comprising the IP address of the network end-point device and a source IP address comprising the IP address of the security device, wherein the destination IP address and the source IP address remain unchanged by the network appliance;

checking and determining whether the IP header of the packet comprises a specific identifier, wherein the specific identifier is included in the IP header by the security device;

retrieving, upon a determination that the packet received comprises the specific identifier, the management command from a payload of the packet to configure the network appliance; and preventing the network end-point device from receiving the packet comprising the management command.

2. The method of claim 1, further comprising:

checking, upon the determination that the packet received does not comprise any specific identifier, according to an existing security protection policy, to determine whether to forward the packet.

3. The method of claim 2, further comprising:

forwarding the packet to the network end-point device when the packet is determined to be safe according to the existing security protection policy.

4. The method of claim 1, wherein the security device is at least one of: a firewall and an intrusion prevention system.

5. The method of claim 1, wherein the specific identifier is one of: a new type of service (ToS) of the IP header of the packet, a special code of the payload, a specific packet length, a specific port, and a specific media access control (MAC) address.

6. The method of claim 1, further comprising performing one of: configuring a network security policy, providing a new network security policy, and updating or extending functions of the network appliance through a software component upgrade.

7. A computer program product for receiving a management command in a network appliance to configure a network security policy, the network appliance connected to a network end-point device, the computer program product comprising:
a computer readable storage medium having program instructions embodied therewith, the program instructions readable by a processor to cause the processor to perform a method comprising:
receiving, by the network appliance, a packet comprising an Internet protocol (IP) header from a security device, the IP header comprising a destination IP address comprising the IP address of the network end-point device and a source IP address comprising the IP address of the security device, wherein the destination IP address and the source IP address remain unchanged by the network appliance;
checking and determining whether the IP header of the packet comprises a specific identifier, wherein the specific identifier is included in the IP header by the security device;
retrieving, upon a determination that the packet received comprises the specific identifier, the management command from a payload of the packet to configure the network appliance; and
preventing the network end-point device from receiving the packet comprising the management command.

8. The computer program product of claim 7, wherein the program instructions further cause the processor to perform the method comprising:
checking, upon the determination that the packet received does not comprise any specific identifier, according to an existing security protection policy, to determine whether to forward the packet.

9. The computer program product of claim 8, wherein the program instructions further cause the processor to perform the method comprising:
forwarding the packet to the network end-point device when the packet is determined to be safe according to the existing security protection policy.

10. The computer program product of claim 7, wherein the security device is at least one of a firewall and an intrusion prevention system.

11. The computer program product of claim 7, wherein the specific identifier is one of a new type of service (ToS) of the IP header of the packet, a special code of the payload, a specific packet length, a specific port, and a specific media access control (MAC) address.

12. The computer program product of claim 7, wherein he program instructions further cause the processor to perform the method comprising:
performing one of: configuring a network security policy, providing a new network security policy, and updating or extending functions of the network appliance through a software component upgrade.

13. An network appliance, comprising:
a bus;
a memory connected to the bus, wherein the memory comprises instructions;
a processing unit connected to the bus, wherein the processing unit is operable to execute the instructions to implement a method of receiving a management command in the network appliance to configure a network security policy, the network appliance operable to connect to a network end-point device, the method comprising:
receiving, by the network appliance, a packet comprising an Internet protocol (IP) header from a security device, the IP header comprising a destination IP address comprising the IP address of the network end-point device and a source IP address comprising the IP address of the security device, wherein the destination IP address and the source IP address remain unchanged by the network appliance;
checking and determining whether the IP header of the packet comprises a specific identifier, wherein the specific identifier is included in the IP header by the security device;
retrieving, upon a determination that the packet received comprises the specific identifier, the management command from a payload of the packet to configure the network appliance; and
preventing the network end-point device from receiving the packet comprising the management command.

14. The network appliance of claim 13, wherein the processing unit is further operable to execute the instructions to implement the method comprising:
checking, upon the determination that the packet received does not comprise any specific identifier, according to an existing security protection policy, to determine whether to forward the packet.

15. The network appliance of claim 14, wherein the processing unit is further operable to execute the instructions to implement the method comprising:
forwarding the packet to the network end-point device when the packet is determined to be safe according to the existing security protection policy.

16. The network appliance of claim 13, wherein the security device is at least one of: a firewall and an intrusion prevention system.

17. The network appliance of claim 13, wherein the specific identifier is one of: a new type of service (ToS) of the IP header of the packet, a special code of the payload, a specific packet length, a specific port, and a specific media access control (MAC) address.

18. The network appliance of claim 13, wherein the processing unit is further operable to execute the instructions to implement the method comprising:
performing one of: configuring a network security policy, providing a new network security policy, and updating or extending functions of the network appliance through a software component upgrade.

* * * * *